United States Patent
Beyerlein

(10) Patent No.: US 9,424,838 B2
(45) Date of Patent: *Aug. 23, 2016

(54) PATTERN PROCESSING SYSTEM SPECIFIC TO A USER GROUP

(71) Applicant: Nuance Communications, Inc., Burlington, MA (US)

(72) Inventor: Peter Beyerlein, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/637,049

(22) Filed: Mar. 3, 2015

(65) Prior Publication Data

US 2015/0179164 A1    Jun. 25, 2015

Related U.S. Application Data

(63) Continuation of application No. 13/589,394, filed on Aug. 20, 2012, now Pat. No. 9,009,043, which is a continuation of application No. 10/479,554, filed as application No. PCT/IB02/02055 on Jun. 5, 2002, now abandoned.

(30) Foreign Application Priority Data

Jun. 6, 2001 (DE) .................................. 101 27 559

(51) Int. Cl.
*G10L 15/07*    (2013.01)
(52) U.S. Cl.
CPC ........................................ *G10L 15/07* (2013.01)
(58) Field of Classification Search
CPC ........................................................ G10L 15/07
USPC ..................................................... 704/231–236
See application file for complete search history.

(56) References Cited

U.S. PATENT DOCUMENTS 5,895,447 A    4/1999   Ittycheriah et al.
5,960,394 A *  9/1999   Gould .................... G09B 19/04
                                                  704/231

(Continued)

FOREIGN PATENT DOCUMENTS

EP    1134725       9/2001
JP    08123461 A    5/1996
JP    2000-089780   3/2000

OTHER PUBLICATIONS

[No Author Listed], "Improving Speech Recognition Accuracy with Multiple Phonetic Models," IBM Technical Disclosure Bulletin NN951237, Dec. 1, 1995, 38(12):73-4.

(Continued)

*Primary Examiner* — Douglas Godbold
(74) *Attorney, Agent, or Firm* — Wolf, Greenfield & Sacks, P.C.

(57) ABSTRACT

Methods and apparatus for identifying a user group in connection with user group-based speech recognition. An exemplary method comprises receiving, from a user, a user group identifier that identifies a user group to which the user was previously assigned based on training data. The user group comprises a plurality of individuals including the user. The method further comprises using the user group identifier, identifying a pattern processing data set corresponding to the user group, and receiving speech input from the user to be recognized using the pattern processing data set.

11 Claims, 2 Drawing Sheets

(56) References Cited

U.S. PATENT DOCUMENTS

| | | | |
|---|---|---|---|
| 6,167,377 A | 12/2000 | Gillick et al. | |
| 6,182,037 B1* | 1/2001 | Maes | G10L 17/06 704/245 |
| 6,253,181 B1 | 6/2001 | Junqua | |
| 6,442,519 B1* | 8/2002 | Kanevsky | G10L 15/07 704/243 |
| 6,493,669 B1 | 12/2002 | Curry et al. | |
| 6,665,639 B2* | 12/2003 | Mozer | G10L 15/285 704/232 |
| 6,735,563 B1 | 5/2004 | Bi | |
| 6,873,951 B1 | 3/2005 | Lin et al. | |
| 7,103,549 B2* | 9/2006 | Bennett | G10L 15/07 704/270 |
| 7,272,561 B2* | 9/2007 | Miyazaki | G10L 15/142 704/256 |
| 2002/0046030 A1* | 4/2002 | Haritsa | G10L 17/26 704/255 |
| 2002/0065656 A1* | 5/2002 | Reding | G10L 15/00 704/244 |
| 2002/0120444 A1* | 8/2002 | Botterweck | G06K 9/6247 704/236 |
| 2002/0138272 A1* | 9/2002 | Bennett | G10L 15/07 704/270 |
| 2002/0143539 A1* | 10/2002 | Botterweck | G10L 15/07 704/255 |
| 2002/0156626 A1* | 10/2002 | Hutchison | G10L 15/16 704/231 |

OTHER PUBLICATIONS

Parsons, "Speech and Voice Processing," McGraw Hill, Inc., 1987, pp. 321-326.

* cited by examiner

PATTERN PROCESSING SYSTEM SPECIFIC TO A USER GROUP

RELATED APPLICATIONS

The present application is a continuation of U.S. patent application Ser. No. 13/589,394, filed on Aug. 20, 2012, which is a continuation of U.S. patent application Ser. No. 10/479,554, filed on Dec. 3, 2003, which is a national stage application under 35 U.S.C. §371 of PCT Application No. PCT/IB2002/002055, filed Jun. 5, 2002, which claims priority to German Application No. 10127559.5, filed on Jun 6, 2001 (a certified copy of which was filed in U.S. patent application Ser. No. 10/479,554), which are hereby incorporated by reference in their entirety.

SUMMARY

The invention relates to a pattern processing system and in particular to a speech processing system. Pattern processing systems and in particular those with speech recognition are used in many locations and for many applications. Examples are the automatic information and transaction systems which are available by telephone, for example the automatic time-table information of the Dutch public transport organizations (OVR) or the telebanking systems of many banks, as well as the information kiosks of the Philips company put up in the city of Vienna, where a user can obtain, for example, information on the sites and the hotels of Vienna by means of keyboard and spoken inputs.

If pattern processing systems are to be used by many users, so-termed user-independent pattern processing data sets are mostly used for the pattern processing, i.e. no distinction is made between the users in the processing of patterns from different users; for example, the same acoustic reference models are used in speech recognition for all users. It is known to those skilled in the art, however, that the quality of pattern processing is improved through the use of user-specific pattern processing data sets. For example, the accuracy of speech recognition systems is enhanced if a standardization of vowel lengths specially attuned to a given speaker is carried out for the spoken utterances of this speaker.

Such speaker-dependent speech recognition systems are widely used nowadays in applications with small user numbers. Examples are personal dictation systems, for example FreeSpeech of the Philips company, or the professional dictation systems for closed user groups, for example SpeechMagic of the Philips company in the field of X-ray medicine. A transfer of these techniques to pattern processing systems with many users, however, is hampered by many difficulties.

Firstly, the large number of users of such a system would lead to a high storage requirement for the user-specific pattern processing data sets. Secondly, it is to be assumed that a larger number of users would not be prepared to make the effort required for training so as to create the user-dependent pattern processing data sets. This training effort would indeed be necessary in practice for each and every system that a user wants to use because the pattern processing systems of individual manufacturers and in part also the individual products of a manufacturer differ from one another, so that the user-specific pattern processing data sets are not exchangeable among the systems.

It is accordingly proposed in Patent Abstracts of Japan JP 08-123461 A that a user should carry an individual information card which contains the individual information data characteristic of this user. The user will then, for example, insert the information card into a slot of the system so as to specialize the speech processing of a respective system (speech interface system) for the individual concerned. The system then reads the data from the card and carries out a user-dependent processing of his spoken utterances by means of these data.

The use of an individual information card also solves the problem of the high storage requirement and the multiple preparation of user-specific data, provided that the manufacturers of the speech processing systems support the use of the card in their systems. It does create the necessity, however, that a user always carries the card with him for using the system and that each system must have an input device for the card. It cannot be used, for example, for the consultation of a telephonic information system.

It is accordingly an object of the invention to provide a pattern processing system, in particular a speech processing system, of the kind mentioned in the opening paragraph which has a quality comparable to that of the user-specific pattern processing systems and which solves the problem of the high storage requirement and the multiple creation of user-specific data, without the necessity of the user having some additional equipment such as, for example, an information card for using the system, while it can also be used in conjunction with existing user terminals such as, for example, the telephone.

This object is achieved on the one hand by means of a method of pattern processing, in particular of speech processing, comprising the steps of:

receiving a unique identifier of a user group laid down for the user, and using a pattern processing data set specific to said user group for processing a pattern input of the user, and on the other hand by means of a pattern processing system, in particular a speech processing system, which is designed for receiving a unique identifier of a user group laid down for the user, and using a pattern processing data set specific to said user group for processing a pattern input of the user.

The problem of the high storage requirement is avoided through the subdivision of the users into user groups. In addition, the pattern processing data sets specific to the user groups may be accommodated in central data memories and may be made available to the pattern processing devices through a network. Further possibilities for saving memory space thug arise from the avoidance of multiple data storage. The multiply shared use of the pattern processing data sets specific to user groups in a plurality of systems avoids the problems involved in a multiple laying-down of the user group for the user.

If a user wants to use the pattern processing system specific to the user group, he must inform the system only of his user group, for example by means of a number or a symbolic name. The user group information may also be accommodated on a chip card, but for using, for example, a telephonic information system it also suffices to inform the system verbally of the user group or, for example, to enter the number through the keyboard of a DTMF-capable telephone in the case of a numerical code. The respective pattern processing system specific to the user group may thus be used also without additional equipment such as, for example, an information card and also by means of existing user terminals such as, for example, a telephone.

The user group may be defined for a user in a training phase, as claimed in claim 2 of the parent application, in which the user, for example, has to pronounce a given text which is recorded by a training system and is used for determining the user group. This training phase May take place independently of a use of a pattern processing system specific to a user group. Alternatively, however, it May be offered during the use of the system to a "new" user, i.e. a user with whom no user group has yet been associated. It is furthermore conceivable to use the pattern inputs of the user entered during use of the system, which were perhaps initially treated with a user-independent pattern processing, for the first or alternatively the renewed definition of the user group. The latter may occur when the pattern characteristics of the user or the user groups of the system have changed.

Many methods from the field of user adaptation axe known to those skilled in the art, for example from the literature, for carrying out such a definition of the user group. Several of these methods, such as, for example, the "speaker clustering" method from speech recognition, directly lead to a user group here. Other methods such as, for example, "adaptive speaker clustering", MLLR, or MAP from speech recognition, or the "characteristic faces" from picture recognition are usually employed for obtaining user-specific pattern processing data sets. The resolution of the adaptation process can be made coarser by a quantization, i.e. by a reduction of the user-specific adaptation parameters to certain levels, such that the desired number of user groups establishes itself.

Claim 3 of the parent application defines how the definition of the user group for the user can be influenced by the user. It is conceivable here, for example, that a system offers user groups of different qualities. Thus a system may offer, for example, user &coups of high quality in that it offers very finely distinguished acoustic reference models for these groups, in which exclusively users of very similar speaking and behavior modes will be present. As a result, recognition accuracies may be offered to such a user group, for example in speech recognition, similar to those obtained in user-dependent systems. The higher expenditure necessary for this purpose in the system could be recovered from the user by means of a corresponding tariff structure.

The dependent claims 4 and 5 of the parent application relate to two advantageous possibilities for user input. On the one hand, user inputs may be made into a public user terminal such as, for example, an information kiosk as mentioned above or an automatic bank counter. On the other hand, a user may use a telephone or PC or laptop, in which case his inputs are transmitted via a network, for example the telephone network or the Internet.

The dependent claim 6 of the parent application specifies a few possible components of a pattern processing data set specific to a user group:
  a language and/or dialect specific to the user group,
  a feature extraction specific to the user group, in particular
    a normalization of vocal-tract length specific to the user group,
  an acoustic reference model specific to the user group,
  a vocabulary specific to the user group,
  a language model specific to the user group, and/or
  a dialogue model specific to the user group.

These are typical components of such a data set which may be used, for example, for a speech recognition specific to a user group. The acoustic reference models may be available, for example, in the form of so-termed Hidden Markov Models for the speech sounds of a language. Vocabularies specific to a user group contain, for example, the words typically used by a user group for an application. Language models may comprise all interrelationships for the formation of a word sequence, i.e., for example, also grammatical rules or semantic preferences of the user group, while dialogue models identify the characteristic patterns of interaction between the system and the users from a user group.

Besides speech recognition, the invention also relates to other types of pattern processing specific to user groups such as, for example, speech encoding specific to a user group, for example through the use of code books specific to a user group. Handwriting recognition and facial expression processing specific to a user group, for example in systems for on-line chatting with animated characters, so-called avatars, also fall within the scope of the invention.

Claim 7 of the parent application claims the use of the system for providing information such as, for example, timetable or touristic information. It is furthermore claimed to use the system for the issuing of orders such as, for example, for effecting purchases from an automatic vending machine or carrying out bank transactions via the Internet.

One embodiment described herein is directed to a method for identifying a user group in connection with user group-based speech recognition. The method comprises an act of receiving, from a user, a user group identifier that identifies a user group to which the user was previously assigned based on training data. The user group comprises a plurality of individuals including the user. The method further comprises acts of using the user group identifier, identifying a pattern processing data set corresponding to the user group, and receiving speech input from the user to be recognized using the pattern processing data set.

Another embodiment described herein is directed to an apparatus for identifying a user group in connection with user group-based speech recognition. The apparatus comprises at least one user interface, at least one memory to store processor-executable instructions, and at least one processor communicatively coupled to the at least one user interface and the at least one memory. Upon execution of the processor-executable instructions by the at least one processor, the at least one processor controls the at least one user interface to receive, from a user, a user group identifier that identifies a user group to which the user was previously assigned based on training data. The user group comprises a plurality of individuals including the user. Further, upon execution of the processor-executable instructions by the at least one processor, the at least one processor identifies, using the user group identifier, a pattern processing data set corresponding to the user group, and controls the at least one user interface to receive speech input from the user to be recognized using the pattern processing data set.

A further embodiment described herein is directed to at least one computer-readable medium encoded with instructions that, when executed on at least one processor, perform a method for identifying a user group in connection with user group-based speech recognition. The method comprises electronically receiving, from a user, a user group identifier that identifies a user group to which the user was previously assigned based on training data. The user group comprises a plurality of individuals including the user. The method further comprises identifying, using the user group identifier, a pattern processing data set corresponding to the user group, and electronically receiving speech input from the user to be recognized using the pattern processing data set.

BRIEF DESCRIPTION OF THE DRAWINGS

These and further aspects and advantages of the invention will be explained in more detail below with reference to the embodiments and in particular with reference to the appended drawings, in which.

DETAILED DESCRIPTION

Figure 1:
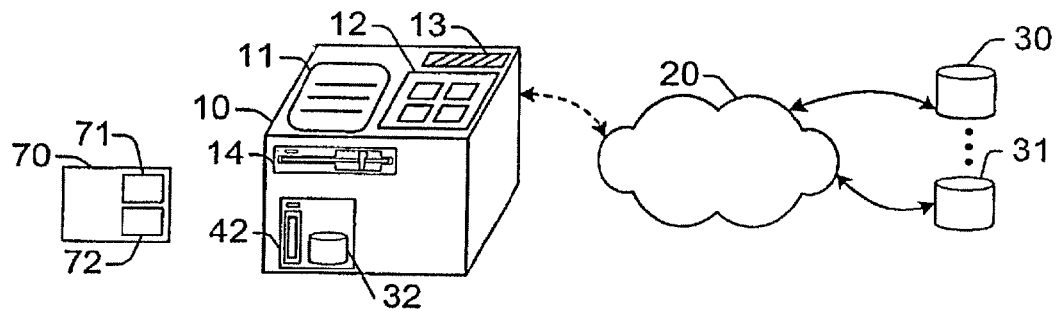
FIGS. 1 and 2 show embodiments of the pattern processing system according to the invention which is specific to a user group, FIG. 3 diagrammatically shows the contents of a data memory for the pattern processing data sets specific to the user group.

FIG. 1 shows an embodiment of the pattern processing system specific to a user group according to the invention which provides a public user terminal 10 for user inputs. Typical applications of such an embodiment of the invention are the carrying out of bank transactions at an automatic bank counter 10, calling up of information at the information kiosks 10 mentioned above, or purchasing tickets from an automatic ticket vending machine 10.

The public user terminal 10 has a graphic display 11, an input keyboard 12, a microphone 13 for putting in spoken messages of a user, and an insertion slot 14 for a chip card 70 characteristic of the user, for example an EC or customer card. Furthermore, it comprises a local speech recognition device 42 which has a local data memory 32 for storing pattern processing data sets specific to a user group for a speech processing specific to the user group. On the user's chip card 7, which is inserted into the slot 14 for the purpose of using the system, there is, for example, a chip 71 for storing data typical of the application, for example the account number of the bank account in the case of a bank card, as well as a further chip 72 for storing a unique identifier of the user group of the user as laid down for the speech processing specific to the user group.

Such a unique identifier may consist, for example, of a number, or alternatively a symbolic name is conceivable, for example the name of a widely known person who also belongs to this user group such that the speech processing characteristic of this person is typical of the user group. Such a symbolic name, but also a number can be readily remembered by a user so that such a unique identifier can be transmitted to the pattern processing system also without the help of a chip card, for example through the microphone 13 or the keyboard 12. In this case, the chip 72 would be redundant on the chip card 70. Alternatively, furthermore, all information could be accommodated on a single chip 71 on the chip card 70, including any user group characterization.

If all pattern processing data sets specific to the user group are stored in the local data memory 32, the local speech recognition device 42 is capable of operating fully independently locally. Such a "stand alone" automatic machine is particularly suitable, for example, for the sale of cigarettes or some other articles directly available from vending machines. The public user terminal 10 may alternatively be connected via a network 20 to further data memories 30 . . . 31 for the storage of pattern processing data sets specific to user groups for the purpose of a speech recognition specific to the respective user group. The network 20 may then be, for example, a private MAN (Metropolitan Area Network), for example the network of a bank. The network 20 may alternatively be realized in the form of a public network, in particular the Internet. A possible hybrid form is, for example, a VPN (Virtual Private Network) realized on the basis of the Internet.

Figure 2:
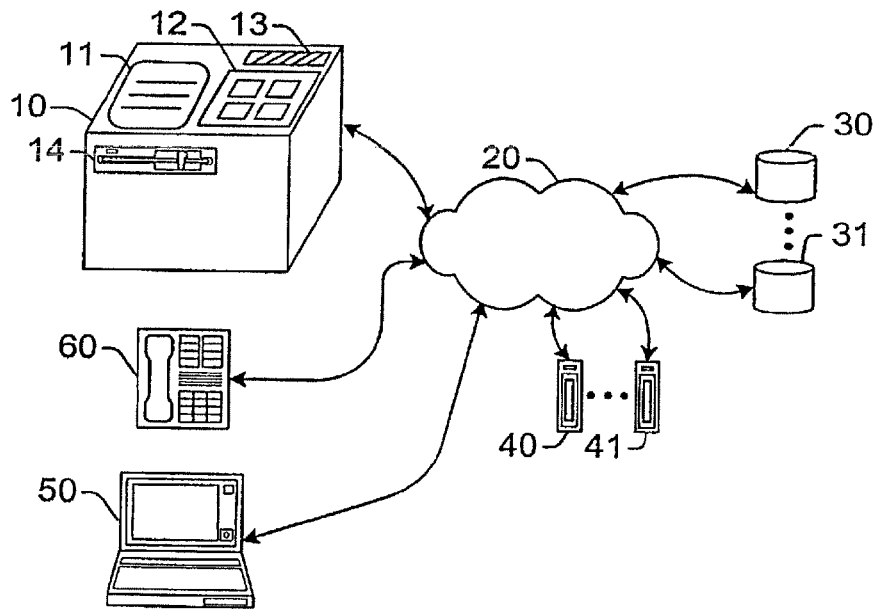

FIG. 2 shows a further embodiment of the pattern processing system according to the invention which is specific to a user group. As in FIG. 1, the network 20 and the data memories 30 . . . 31 connected thereto are shown. By contrast to FIG. 1, however, the speech recognition devices 40 . . . 41 are also connected to the network 20. The user inputs are made in a public user terminal 10 here, which terminal, unlike FIG. 1, has no local speech recognition device 42 with a local data memory 32, or through a telephone 60 or a PC, a laptop, or the like 50, which are all connected to the network 20 for this purpose or can be connected thereto. These and other input possibilities such as, for example, the public user terminal 10 shown in FIG. 1 with a local speech recognition device may be realized all or only in part in a pattern processing system specific to a user group.

The scenarios shown in FIGS. 1 and 2 accordingly differ especially in the arrangement of the speech recognition device 42 or 40 . . . 41 in which the recognition of the spoken utterances of a user takes place. The speech recognition device 42 accommodated locally in the public user terminal 10 of FIG. 1 is particularly suitable for the case in which only simple commands are to be recognized and the public user terminal 10 is mainly used by the same customers all the time. A Comparatively simple and inexpensive speech recognition device 42 will suffice in this case, and the pattern processing data sets specific to the user group of the main users may be stored in the local data memory 32 of the speech recognition device 42 for a speech recognition which is specific to the user group. Further pattern processing data sets specific to the user group, for example required by itinerant users and not present locally in the data memory 32, are loaded from data memories 30 . . . 31 connected via the network 20. This leads to a small overall load of the network 20.

In FIG. 2, the speech recognition of the spoken utterances of a user takes place in the speech recognition devices 40 . . . 41 connected via the network. This is useful in the case of more complicated spoken utterances which require a high recognition performance and/or in the case of continually changing users. The joining together of the speech recognition tasks and the data storage yields advantages in the machine occupancy, the memory space required, and the necessary data traffic through the network 20. Thus it may be useful, for example, to connect the speech recognition devices 40 . . . 41 with one another and with the data memories 30 . . . 31 by means of a broadband sub-network within the network 20. It may also be advantageous in certain cases to allocate the recognition of the spoken utterances of individual users always to the same speech recognition device 40 . . . 41 as much as possible, which device may then hold the pattern processing data sets specific to the user group of this user in local data memories again.

Besides the system embodiments mentioned above, many further modifications may be readily implemented by those skilled in the art in dependence on the field of application. It suffices accordingly to mention here the technique of mirrored data storage which is sufficiently known from the field of distributed databases. The data of a user, i.e. a user group in this case, are held in several, usually spatially widely separated data memories, for example in the memories 32 and 30 . . . 31 in FIG. 1, so as to afford the user a fast access to his/her data also in the case of a high load on the network 20. The consistency of the data held in the individual memories is then ensured by means of suitable synchronization procedures which are less critical as to time and may be carried out, as desired, at times of low network loading.

A further embodiment of the invention arises when the pattern processing data sets specific to user groups are not held in data memories belonging to a system and designed for pattern processing specific to the user groups, but are made available, for example, by a third-party provider or alternatively by a user himself (for his own user group). In the former case, third parties may specialize in the creation, management, and/or updating of the pattern processing data sets specific to the user groups in order to make them available to the operators of the pattern processing systems specific to the user groups, for example against payment. Third parties may also take care of the definition of the user group membership for the users.

In the latter case, a user himself would download the pattern processing data sets specific to his own user group, for example from one of the data memories 32, 30 . . . 31 of a pattern processing system specific to the user group. If a different pattern processing system specific to user groups is used, which system itself does not have the pattern processing data sets specific to the respective user group of this user, he may make the respective data available to the system on the laptop 50. In general, however, he may also make them available via a PC connected to the network 20, i.e. in particular to the Internet, in which case he would then inform the system of the address of this PC. In this scenario, accordingly, the message containing the address of the PC or laptop 50 would perform the task of providing the unique identifier of the user group.

User terminals used in the embodiments described above for obtaining access to the system were public user terminals 10 of average complexity, telephones 60, and PCs or laptops 50, but alternative solutions are equally possible. Examples are mobile telephones and information kiosks with complicated multimedia interaction possibilities such as touch screens, cameras, loudspeakers, etc.

Figure 3:
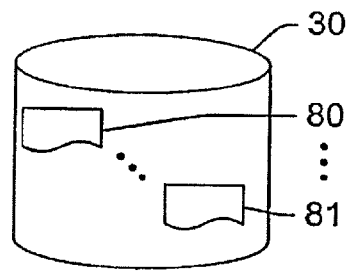

FIG. 3 is a diagram showing the contents of a data memory 30 for the pattern processing data sets 80 . . . 81 specific to the user groups. The data memory 30, which here represents the local data memory 32 as well as the further data memories 30 . . . 31 connected to the network 20, is a known computer data memory, for example a hard disk. The pattern processing data sets 80 . . . 81 specific to user groups may be available in the form of individual data files, for example in binary code suitable for the pattern processing system specific to user groups. An alternative possibility is an organization in the form of a database or the like.

Figure 4:
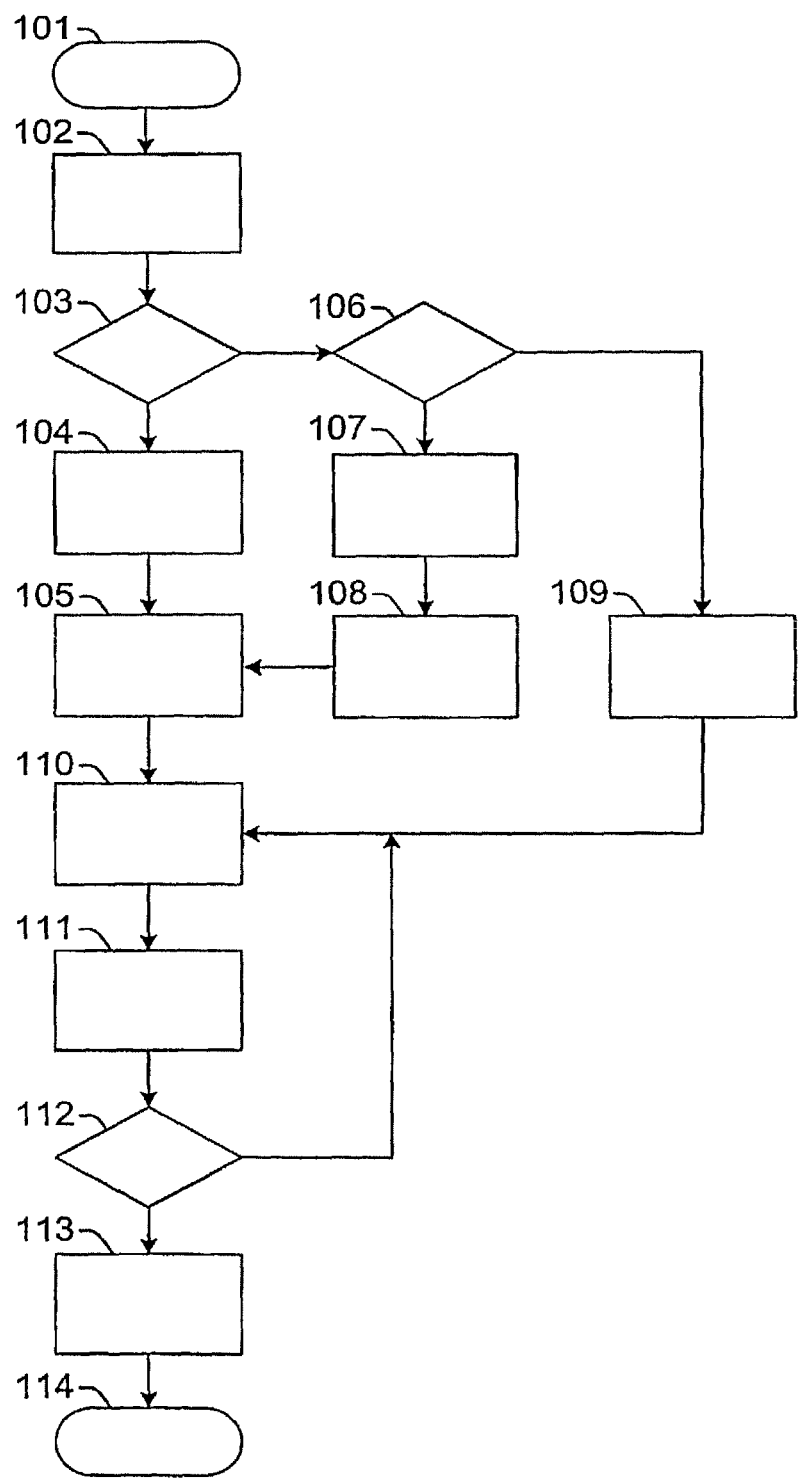
FIG. 4 shows the sequence of use of a pattern processing system specific to the user group according to the invention in the form of a flowchart.

FIG. 4 shows a possible sequence of the use of a pattern processing system specific to user groups according to the invention in the form of a flowchart. Only those processes are discussed which are relevant to the pattern processing specific to user groups, while actions specific to the application such as, for example, the communication of a bank account number and a PIN code for a banking application are not represented.

After the start block 101, the pattern processing system specific to user groups requests a user in process block 102 to identify his user group, i.e. to enter into the system a unique identifier of the user group defined for the respective user for the purpose of a pattern processing specific to the user group. After the decision block 103, the further process branches off in dependence on whether the user knows his user group or not.

If the user knows his own user group, he communicates it to the system in block 104 in that, for example, he inserts the chip card 70 into the insertion slot 14 of a public user terminal 10, in the scenarios of FIGS. 1 and 2, he uses the keyboard 12 or the microphone 13 of the public user terminal 10, or he makes the user group known to the system through a telephone 60 or a laptop 50. The system then searches in block 105 the pattern processing data set specific to the user group of the user in a data memory 32, 30 31 and makes it available in a pattern processing device 42, 40 . . . 41.

If the user does not know his own user group, the system requests him in block 106 whether he wants the system to define a user group for him now. If he wants to do so, the system collects training pattern inputs of the user in block 107 and processes these so as to define a user group for the user. The user group thus determined is communicated to the user in block 108, and the control switches to block 105 described above, in which the pattern processing data set specific to the user group of the current user is looked up in a data memory 32, 30 . . . 31 and is made available to a pattern processing device 42, 40 . . . 41.

If the user does not want a user group to be laid down for him now, for example because he has no time for it at the moment or because a user group was assigned to him already, whose unique identifier he does not have available at the moment, the control branches from block 106 to block 109. There a user-independent pattern processing data set is looked up in a data memory 32, 30 . . . 31 and is made available to a pattern processing device 42, 40 . . . 41 such that the subsequent pattern processing steps are carried out independently of the special characteristics of the user.

The user-group-specific or user-independent pattern processing data set made available to the pattern processing device 42, 40 . . . 41 in one of the blocks 105 and 109 may be dependent on further conditions. Thus, for example, different ambient conditions may hold for different applications, for example different background noises in the case of speech recognition, or different terminals for user inputs such as the microphone type in the case of speech input or the camera type in the case of gesture recognition, and a suitably adapted pattern processing data set may be used for these.

After block 105 or 109, as applicable, the pattern input of the user is processed in block 110, i.e. the user is requested to enter a pattern and the pattern entered is recorded and processed. Such pattern inputs may be spoken utterances put in through a microphone 13 or a telephone 60. Other possible inputs are handwritten texts and/or pointer actions for selecting menu items offered on the display 11. The display 11 of the public user terminal 10 may be constructed for this purpose, for example, as a touch screen, and/or the public user terminal 10 could be fitted with a camera.

Optionally, the pattern inputs of the user effected in block 110 may be put into intermediate storage and may be used, for example, for testing the user group definition for the user. When a sufficient amount of user inputs has been collected for such a test and it has been ascertained that the instantaneous user group definition is not an optimum for the user from the point of view of pattern processing, the system may load a better suited pattern processing data set specific to the user group of the user, in consultation with the user, into a pattern processing device 42, 40 . . . 41 so as to carry out the further pattern processing steps therewith. Such a procedure may also be carried out, for example, if the patterns had been processed up to that moment on the basis of a user-independent pattern processing data set.

In block 111, the actions corresponding to the pattern input of the user are carried out, for example account data are shown on the display 11 of the public user terminal 10 in the case of a bank transaction. It is also possible for return questions to be put to the user. The user may also be requested for a further input such as, for example, a lacking bank code number.

It is decided in block 112 whether the interaction with the user has been completed. If this is not the case, the control returns to block 110 so as to process the next pattern input from the user. If the interaction with the user is Complete, any new or modified user group is stored in the data memory 32, 30 . . . 31 for the user, if applicable, if these data had been, for example, held in storage locally only in one of the speech recognition devices 42, 40 . . . 41 up to that moment. Then the system terminates the processing of the user inputs in block 114.

The termination of the interaction with the user in block 112 may follow, for example, the recognition of a positive reply of the user to a relevant previous system question in block 110. Alternatively or additionally, however, a termination button on the input keyboard 12 of the public user terminal 10 may be provided, which may be operated at any moment in the man-machine communication. Further modifications obvious to those skilled in the art are conceivable.

Blocks 107 and 113 provided the possibility of defining a user group for the user during such a man-machine communication, and blocks 110 and 113 rendered it possible to modify such a user group definition. Defining or modifying a user group, however, need not take place within the framework of a utilization of the system, for example for carrying out bank transactions, but it may alternatively be done separately.

This possibility would appear to be particularly interesting, for example, for one of the scenarios shown in FIG. 2 in which a user can have his user group defined at leisure from his own home He may then, for example, load a software made available by a system operator locally into a laptop 50 and/or use the infrastructure of the operator accessible via the Internet such as processors, programs, and/or data memories. The scenario for defining a user group directly at the public user terminal 10 as described with reference to FIG. 4 also has its justification because this definition is better adapted to the conditions of use of the relevant machine such as, for example, microphone or camera properties or ambient noise.

Although FIG. 4 clarified essential aspects of a method according to the invention for a pattern processing specific to user groups, it will be clear to those skilled in the art that such a method should contain further mechanisms in practice, for example for the treatment of error conditions. Thus it may arise, for example, that the user group of a user laid down by a system is not known to another system. This other system may then act for the purpose of error treatment, for example, exactly as in the case described starting from block 106, where the user does not know his own user group at that particular moment.

What is claimed is:

1. A method for identifying a user group in connection with speech recognition, the method comprising:
   receiving, by at least one computer, a user group identifier that identifies a user group to which a plurality of users including a first user were assigned prior to the at least one computer receiving the user group identifier;
   wherein the assignment of the first user to the user group was based at least in part on one or more speech utterances of the first user, and
   wherein the user group identifier uniquely identifies a pattern processing data set shared by the plurality of users assigned to the user group; and
   receiving, by the at least one computer, speech input from the first user to be recognized using the pattern processing data set.

2. The method of claim 1, further comprising:
   receiving training pattern speech input from the user; and
   assigning the user group identifier to the user based on the training pattern speech input.

3. The method of claim 1, wherein the user group identifier comprises a numeric code.

4. The method of claim 1, wherein the user group identifier comprises a symbolic name.

5. The method of claim 1, further comprising accessing, via at least one network, the pattern processing data set.

6. The method of claim 1, further comprising performing recognition of the speech input using the pattern processing data set.

7. The method of claim 1, wherein the pattern processing data set includes at least one acoustic model and/or at least one language model.

8. A method comprising:
   transmitting, to at least one server, a user group identifier that identifies a user group to which a plurality of users including a first user were previously assigned prior to transmitting the user group identifier,
   wherein the assignment of the first user to the user group was based at least in part on one or more speech utterances of the first user, and
   wherein the user group identifier uniquely identifies a pattern processing data set shared by the plurality of users assigned to the user group; and
   providing speech input from the first user to be recognized using the identified pattern processing data set.

9. The method of claim 8, further comprising receiving recognized text resulting from speech recognition of the speech input using the pattern processing data set.

10. The method of claim 8, further comprising receiving, by a user device, the pattern processing data set.

11. The method of claim 10, further comprising performing, by the user device, speech recognition based at least in part on the pattern processing data set and the speech input.

* * * * *